(12) United States Patent
Abelow

(10) Patent No.: US 6,883,694 B2
(45) Date of Patent: Apr. 26, 2005

(54) TETHER ARRANGEMENT FOR PORTABLE ELECTRONIC DEVICE, SUCH AS A LAP-TOP COMPUTER

(76) Inventor: Benjamin Abelow, 49 Deepdale Dr., Great Neck, NY (US) 11021

( * ) Notice: Subject to any disclaimer, the term of this patent is extended or adjusted under 35 U.S.C. 154(b) by 0 days.

(21) Appl. No.: 10/277,509

(22) Filed: Oct. 22, 2002

(65) Prior Publication Data

US 2003/0075578 A1 Apr. 24, 2003

Related U.S. Application Data

(60) Provisional application No. 60/331,092, filed on Oct. 22, 2001.

(51) Int. Cl.[7] .............................. A45C 1/02; A45F 3/00; F41C 33/02; F42B 39/02
(52) U.S. Cl. ...................... 224/666; 224/930; 24/3.13; 361/683
(58) Field of Search ................... 224/666, 930; 108/43; 361/683; 24/3.1, 3.13

(56) References Cited

U.S. PATENT DOCUMENTS

| | | | | | |
|---|---|---|---|---|---|
| 126,213 | A | * | 4/1872 | Ireland et al. ................ | 108/43 |
| 128,739 | A | * | 7/1872 | Mahan ......................... | 108/43 |
| 1,520,085 | A | * | 12/1924 | Rossiter, Jr. ................ | 248/637 |
| 3,361,091 | A | * | 1/1968 | Inman ......................... | 108/43 |
| 4,715,293 | A | * | 12/1987 | Cobbs ......................... | 108/43 |
| 4,977,860 | A | * | 12/1990 | Harwell ....................... | 119/794 |
| 5,667,114 | A | * | 9/1997 | Bourque ...................... | 224/270 |
| 5,713,548 | A | * | 2/1998 | Boyer et al. ............. | 248/205.2 |
| 5,724,225 | A | * | 3/1998 | Hrusoff et al. .............. | 361/683 |
| 5,887,777 | A | | 3/1999 | Myles et al. | |
| 5,927,210 | A | * | 7/1999 | Hacker ......................... | 108/43 |
| 5,937,765 | A | * | 8/1999 | Stirling ....................... | 108/43 |
| 5,938,096 | A | * | 8/1999 | Sauer et al. ................ | 224/625 |
| 5,938,137 | A | * | 8/1999 | Poulson .................. | 242/379.2 |
| 5,988,469 | A | * | 11/1999 | Musacchia .................. | 224/267 |
| 6,006,970 | A | | 12/1999 | Piatt et al. | |
| 6,062,522 | A | * | 5/2000 | Svegliato ............... | 248/346.01 |
| 6,101,086 | A | * | 8/2000 | Kim et al. .................. | 361/683 |
| 6,116,166 | A | * | 9/2000 | Rotstein ....................... | 108/43 |
| 6,182,169 | B1 | * | 1/2001 | Force et al. ................. | 710/62 |
| 6,328,193 | B1 | * | 12/2001 | Schiff ......................... | 224/660 |
| 6,381,127 | B1 | * | 4/2002 | Maddali et al. ............. | 361/683 |
| 6,502,727 | B1 | * | 1/2003 | Decoteau .................... | 224/162 |
| 2002/0117092 | A1 | * | 8/2002 | Zeiders | |

FOREIGN PATENT DOCUMENTS

EP       0555106 A1  *  8/1993

* cited by examiner

*Primary Examiner*—Sue A. Weaver
(74) *Attorney, Agent, or Firm*—Herb Dubno

(57) ABSTRACT

A tether arrangement for a laptop computer having two independently adjustable and lockable tethers which are connected to the laptop computer, e.g. at the sides or by a loop passing over a portion of the computer, and connected to two points on the clothing of a seated person using the computer on the lap, for example by clips attached to belt loops.

10 Claims, 9 Drawing Sheets

TETHER ARRANGEMENT FOR PORTABLE ELECTRONIC DEVICE, SUCH AS A LAP-TOP COMPUTER

CROSS REFERENCE TO RELATED APPLICATION

This application is a non-provisional application corresponding to provisional application 60/331,092 filed 22 Oct. 2001.

BACKGROUND OF THE INVENTION

1. Background—Field of Invention

This invention pertains to electronic devices that can be used on the lap of a seated user, such as a laptop computer, and more particularly to maintaining such devices in a secure and stable condition while on the lap, and to preventing the devices from falling to the floor.

2. Background—Discussion of Prior Art

Inventors of relevant prior art have pointed to, and attempted to remedy, practical problems involved in the use of the laptop computer. For example, it has been previously noted that when a laptop computer is being used while on the lap it is at risk of slipping off the lap and falling onto the floor, being damaged as a result (e.g., Bourque, U.S. Pat. No. 5,667,114, contains a discussion of this problem; see especially paragraph 4 of Bourque's Background section). The current invention also serves to remedy practical problems associated with use of the laptop computer, as well as other electronic devices that can be used on the lap, but it differs from the prior art in important ways.

Scrutiny of prior art reveals seven specific structural and functional characteristics that frequently recur and which typically differ between the prior art and the invention disclosed in this application. Because awareness of these differentiating characteristics can help one appreciate the novelty and non-obviousness of the current invention, these characteristics will be enumerated before specific prior art patents are discussed. The seven characteristics are:

1. Prior art is designed to be used primarily, and in many cases exclusively, in a standing or walking position; in contrast, the invention being disclosed here is designed to be used by a person who is working in a seated position. As a result, the problems addressed by the prior art are frequently not the same as those addressed by the current invention.

2. Prior art generally provides a flat physical surface—such as a tray, desk, or platform—upon which the laptop computer rests; in contrast, the invention being disclosed here allows the laptop computer to rest directly on the user's lap.

3. Prior art generally includes means that transfers the weight of the laptop computer to the shoulders or other parts of the body; in contrast, the invention being disclosed here allows the weight of the laptop to be borne and carried by the lap itself.

4. Prior art establishes a predetermined and non-adjustable working distance between the laptop computer and the user, thus setting the degree to which the arms must be extended to reach the keyboard; further, the prior art maintains the computer in a square position with respect to the body, so that the left and right arms are extended equally when resting on the keyboard, but does not allow the user the option of positioning the laptop off-square (angled). In contrast, the current invention allows the user to adjust the working distance between the laptop and the user, as well as to determine whether the laptop will be square or off-square with respect to the user's body.

5. Prior art immobilizes the laptop against a specific part of the abdomen or thigh; in contrast, the invention disclosed here does not immobilize the laptop computer against a part of the body. In fact, in the invention disclosed here, the laptop can be easily moved about on the lap. This freedom of movement is inherent in the notion of a "tether." The notion of tethering is essential to our invention and a central point of differentiation between our invention and the prior art.

6. Prior art makes use of straps and similar flexible members for the function of "support," or to pull the laptop into direct apposition against the body of the user; in contrast, in the invention being disclosed here, flexible members function to tether the laptop in a manner that does not carry the weight of the laptop while it is in use and does not pull the laptop against the body.

7. Prior art tend to be relatively bulky, heavy, and to have one or more parts that cannot easily be folded or compressed into a small space, for transport or storage; in contrast, the invention disclosed here is small and light, with its non-compressible parts being very small and thus allowing the user to more easily fit the invention into a small space.

An awareness of these above seven characteristics can help one differentiate the invention disclosed in this application from prior art patents. These differences are apparent in the following prior art patents, which are the most relevant uncovered in a careful search:

Cobbs (U.S. Pat. No. 4,715,293) provides a "desk" to support the laptop computer, and a rigid support system with shoulder frames to transfer the weight of the laptop to the shoulders of a standing user.

Bourque (U.S. Pat. No. 5,667,114) provides a "platform" that supports the laptop computer, as well as shoulder straps that transfer the weight to the shoulders. The dimensions of the platform, which rests directly against the front of the user's body, determines the working distance between the user and the laptop computer.

Boyer et al. (U.S. Pat. No. 5,713,548), although designed to be used by a seated user and to let the weight of the laptop be carried by the lap, does not tether the laptop computer to the user, but instead provides a thick Velcro band that is wrapped around the upper legs; this Velcro band adheres to Velcro pads that are attached to the bottom of the laptop computer, the result being that the laptop computer "sticks" to the lap.

Hrusoff et al. (U.S. Pat. No. 5,724,225) provides a "tray" that supports the laptop computer, and a system of straps that transfers weight from the tray to the shoulders.

Myles et al. (U.S. Pat. No. 5,887,777) provides a shoulder strap that supports the weight of the laptop computer, for use in the standing position.

Sauer et al. (U.S. Pat. No. 5,938,096) provides a platform-like bottom panel that carries the weight of the laptop, for use in the standing position. Also included are straps to transfer weight from the panel to the shoulders, and also a waist strap that pulls the laptop against the user's body.

Piatt (U.S. Pat. No. 6,006,970), for use while standing or walking, provides both a harness and a leg, which extends to the floor, to support the weight of the laptop, and a belt mechanism that holds the laptop immobile in fixed relation to the front of the body.

Svegliato (U.S. Pat. No. 6,062,522) provides a platform-like "flat planar surface," which is belted at a fixed distance from the user, for use with a computer "mouse."

3. Background—Problems Addressed by the Invention

When a laptop computer rests on the lap of a seated user, there is a tendency for the laptop to slip off the user's lap or to move in other unwanted and problematic ways. First, there is a tendency for the laptop to move far forward or far to the sides, or between the user's legs, thus falling off the lap and striking the floor. In fact, many laptops are damaged by this type of fall. Second, there is a tendency for the laptop computer to slide forward on the lap so that, even without falling off the lap, it is positioned a greater distance from the user's hands, arms, and upper body than is comfortable or ergonomic. Third, there is a tendency for the laptop computer to rotate on the lap surface, in a clockwise or counter-clockwise direction, such that the laptop is not "square" with respect to the user's upper body but instead rests in such a position that the right arm and left arm must be unequally extended from the body in order to reach the keyboard of the laptop. These and other untoward movements of the laptop computer can be induced by gravity or by inadvertent body movements.

To prevent or minimize these untoward movements of the laptop computer, or to correct them once they occur, takes ongoing attention and effort by the user. For example, when a person sits with feet flat on the floor, the knees may be lower than the thighs and this creates a downward-sloping lap surface, which can cause the laptop to slide forward and fall off the lap. To correct this slope, many users attempt to elevate the knees by raising their heels off the ground, in a manner that is awkward and uncomfortable. As another example, concern about the laptop falling between the legs leads some users to pull the knees together into an awkward and uncomfortable position.

Because inadvertent movements of the leg, torso, or virtually any part of the body can cause the laptop to move or fall, the user must remain constantly vigilant against all body movements, however minor. The user is thus constrained in all physical movements, be they subtle or gross. The user necessarily exists in a condition of subtle vigilance and even stress and tension, because of concern about what will happen if attention to the disposition of the laptop is momentarily relaxed. Further, the efforts and postures undertaken to prevent the laptop from moving or falling produce in the user a state of discomfort. The user must never stand or stretch without giving careful thought to the disposition of the computer; a user who stands or stretches carelessly may eject the laptop onto the floor. The need to carefully attend to these untoward possibilities distracts the user from work being carried out on the laptop.

BRIEF SUMMARY OF THE INVENTION

It is an object of the present invention to overcome the aforementioned problems by providing a tether arrangement that helps retain the laptop computer on the lap of a seated user, that prevents the laptop from falling to the floor, and that helps stabilize the laptop in a comfortable and ergonomic position.

It is another object of the present invention to allow the laptop computer to rest directly on the lap, without the need for a platform or other supporting structure interposed between the user and the laptop, and without the need to transfer the weight of the laptop computer off the lap and onto the shoulders or other part of the body.

It is an another object of the present invention to provide ergonomic customization by allowing the user to easily, rapidly, and conveniently adjust and change the distance between the laptop computer and the body of the user and hence to change the extent to which the arms must be extended to reach the keyboard.

It is an another object of the present invention to allow the user to adjust the position of the laptop so that it is square with respect to the upper body, thus allowing the extension of the left and right arms to be equal when resting on the keyboard, but also to allow users who desire it to position the laptop in a non-square position, that is, so that their left and right arms are unequally extended when resting on the keyboard.

It is an another object of the present invention to stabilize the laptop on the lap in a manner that does not bind the laptop computer to, or otherwise immobilize the laptop computer against, a specific part of the body, such as against a specific point on the abdomen or thigh, but which instead allows the laptop to be moved on the lap surface, or even momentarily lifted off of the lap surface, in whatever manner is desired by the user.

It is an another object of the present invention to provide such a tether arrangement that is small and which adds very little bulk or weight to the computer, and which tends to be easily foldable or otherwise compressible into a small space, thereby allowing for convenient transport or storage.

It is another object of the invention to provide such a tether arrangement that can be provided as original equipment with a laptop computer especially constructed or modified to cooperate with the tether arrangement.

It is another object of the present invention to provide such a tether arrangement that can be used with existing laptop computers, including those which have previously been sold and are already in use; that is, to provide a tether arrangement that can be "retrofit" onto existing computers.

It is another object of the invention to provide such a tether arrangement that is inexpensive to produce and incorporate with new laptops and with existing laptops.

Additional objects of the present invention are to provide such a tether arrangement that is simple to use; that allows the user greater freedom of movement and greater freedom with regard to the placement of the legs, arms, and hands, and with regard to body positioning and posture; that allows freedom from worry and anxiety over the possibility of having the laptop fall off the lap and therefore allows greater freedom to concentrate on the work being carried out on the laptop; that affords a general sense of ease in operation of the laptop; and that allows the user to safely stand or stretch during a break from work without causing the laptop to fall and strike the floor.

Other objects and advantages of the present invention will become apparent later in this application, especially in the detailed descriptions of the preferred embodiments.

DEFINITIONS

Definition of the Essential Concept: a Tether

The essence of this invention is that it provides a tether. Because of the centrality of the concept of a tether, we have included a brief discussion to aid in transparency. The American Heritage Dictionary (fourth edition) says a tether is "a. A rope, chain, or similar restraint for holding an animal in place, allowing a short radius in which it can move about. b. A similar ropelike restraint used as a safety measure, especially for young children and astronauts." Similarly, the Random House Unabridged Dictionary (second edition) defines tether as "A rope, chain, or the like, by which an animal is fastened to a fixed object so as to limit its range of movement." (Figurative phrases like being at "the end of their tether" are based directly on the literal meaning of the term tether; this phrase means "they can go no further"—as if their tether is already stretched to the limit.)

To see clearly how a tether works, consider an animal that is tethered to a fixed object. This animal can move to a certain distance from the fixed object, until the tether is pulled taught. The fully extended tether thus forms what is, in essence, the radius of a circle, and the animal is free to roam within that circle but not beyond the circle's diameter. If the animal walks out to the diameter of the limiting circle, and walks along that diameter, the tether, which is the radius of the circle, sweeps over a pie-wedge-shaped area.

It is an obvious fact, but still important to emphasize, that a tether does not "support" an animal, person, or object that is tethered. That is, the tether does not, as part of its normal function, bear weight. That weight is borne by the ground. Thus, the tether restricts movement but does not bear weight. However, if there is a steep drop within the area in which the animal can freely roam, and the animal falls into the fissure, the tether will reach its full extent as the animal falls, and when the tether becomes taught it will then bear the weight of the animal. As this example suggests, the only time a tether bears weight is if the tethered animal or object falls from the normal ground level.

More than one tether can be used to restrain the same animal or object. The result of using two tethers is similar to that obtained from a single tether, except that the domain in which the object is constrained is not a simple pie-wedge-shaped area, but instead is a more complex shape. The shape will be determined by a many variables, including, for example, the relative lengths of the two tethers. Mention of a two-tether system is relevant because in some of the preferred embodiments of the invention disclosed herein, a laptop is attached to the user by two separate tethers, each of which may originate from different points on the user and each of which may terminate at different points on the laptop.

A variant of the two-tether arrangement just described is a single, long tether that both originates and terminates on the object being restrained, but which is long enough so that some intermediate region of the tether can pass around and behind an immobile object. This arrangement creates two functional tethers out of a single piece of rope or other tether material. For example, if both ends of a long piece of rope are tied to an animal, and an intermediate portion of that rope is tossed over a fixed object, such as a post, the animal will effectively be tethered to the post by two tethers. As will become clear in the discussion of preferred embodiments, some embodiments of the current invention make use of a single piece of tether material passed behind the back of the user, with both free ends attached to the laptop.

While a tether often consists of a single piece of material, such as a single continuous length of cord, it is also possible to construct a single tether out of several pieces of tether material that are connected end to end. Thus, a single tether may be either uni-segmental or multi-segmental in construction. Also, a tether, while generally attached at its ends, may also be attached at any two intermediate points, so long as there is some space between these points. Although not especially convenient, one can even make a tether out of a closed loop of material, such as a cord that has been tied into a closed loop; in this situation, one can form a tether by designating any two spaced-apart points on the loop, connecting one designated point to one object and the other designated point to another object.

Lexicon of Specific Terms and Phrases Used in This Application

Consider a situation in which a laptop computer is resting on the lap of a seated user, and is tethered by a cord to a belt loop on the user's trousers. In this application, and in the Claims in particular, we have found it useful to refer to the physical material that extends between the two tethered objects, and which effects the tether connection (such as a cord) as a "tethering element."

The term "tethering element" is broad and does not specify any particular embodiment or material. It may pertain, for instance, to a system where a cord is attached at its two ends to the tethered objects, or a system where the cord is attached some distance from its ends to the objects; or even to a closed loop of cord that is attached at two-spaced apart points to the tethered objects. It should also be emphasized that a tethering element may be composed of a single, unified, and undivided piece of material, such as a single length of cord, or it may be composed of a number of pieces of material that are aligned in series, that is end to end, and connected with each other.

Consider a laptop computer tethered to a user. We have found it convenient to speak of "connector means," "means of connecting" or "means of securing." Using this means terminology allows for the possibility of specific pieces of hardware that facilitate the connection, such as male-female couplers, but it also allows for the possibility that the tethering element itself be modified to effect the connection.

We also must address the question of how to speak of the tethering situation as a whole. In this application, and in the claims in particular, we have found it useful to speak of the tethering element, along with the means of connecting this element to both the user and the electronic device in question, as the "tether arrangement." In addition, in some situations, for example, when the means of connecting the tether to a laptop computer is built into the laptop computer as original equipment, we may also include the laptop computer or other electronic device as part of the "tether arrangement." The term "tether arrangement" may also include other elements associated with the tethering element or the means of connection. For example, if a mechanism for adjusting the effective length of the tethering element is described, this mechanism will be considered part of the tether arrangement.

This invention pertains to a broad category or class of electronic devices that can, either currently or potentially (e.g., through modification or redesign), be used on the lap of a seated user. We have found it convenient to designate this entire class or category with the term "lap-usable." The most common and readily identified member of this class or category is the laptop computer, which because of its design, portability, and small size is ideally suited for use on the lap. However, the term "lap-usable" is broad, and encompasses many other electronic devices, some of which are not even fully portable. For example, electronic keyboards or other types of data-entry terminals may be usable on the lap even though they may be attached by wires of limited length to a large, immobile computer or instrument panel; such devices are encompassed by the term "lap-usable" and are therefore suitable for use with the invention disclosed here, although they are not fully portable in the same way a laptop computer is. Although we use the term "lap-usable" in the claims, it is more convenient to use a specific example when describing preferred embodiments, and for this reason we will discuss the laptop computer. But it should be understood that this focus on the laptop computer does not limit the intended scope of the invention in any way.

BRIEF DESCRIPTION OF THE DRAWINGS

FIG. 9 shows a combined length adjuster and connection terminal.

DESCRIPTION OF THE PREFERRED EMBODIMENTS

For this invention, no single embodiment is truly "preferred" because the desirability of any particular embodiment will be determined by multiple factors, including the type of electronic device it is used with, the weight of the electronic device and how it balances on the user's lap, and other technical and aesthetic considerations. Nonetheless, it is possible to show one embodiment in detail and then to discuss alternative embodiments with reference to it.

Figure 1:
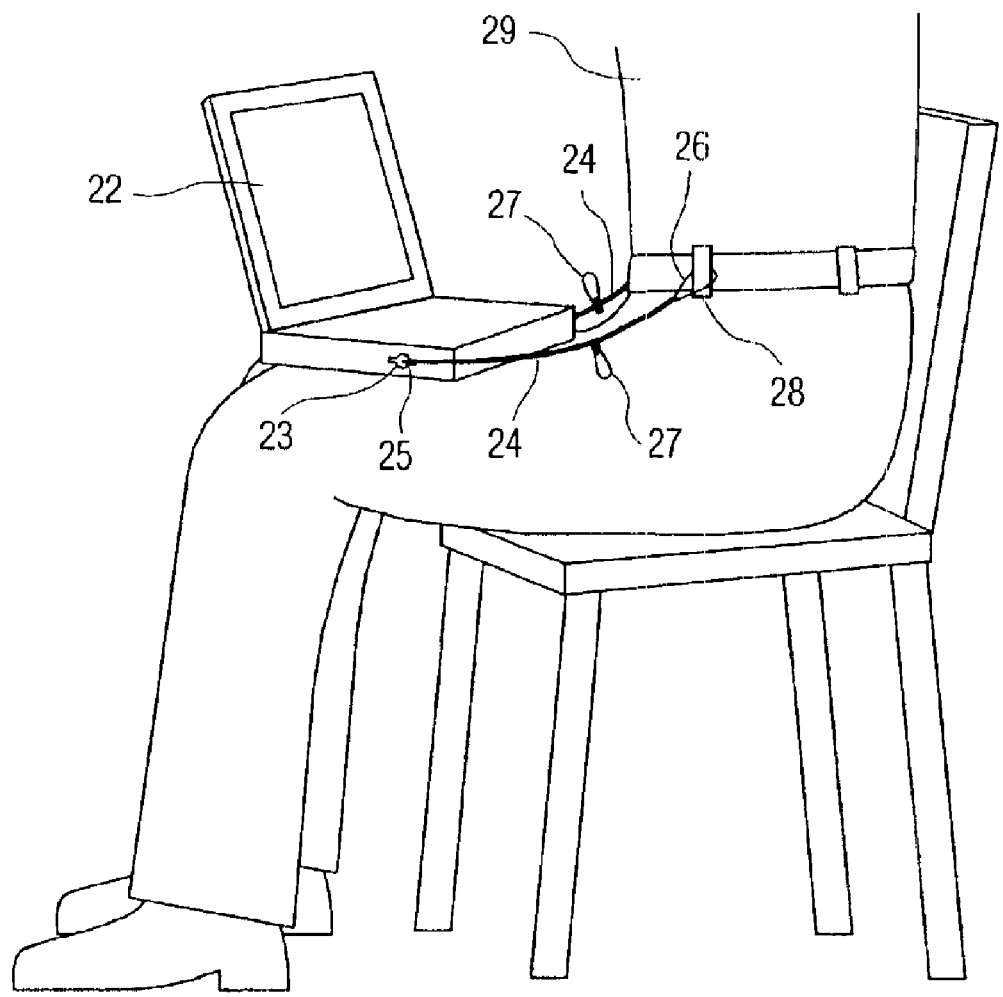
FIG. 1 is a fragmentary perspective view of a seated person using a laptop computer on the lap and employing a tether arrangement according to the present invention.
Figures 2A, 2B:
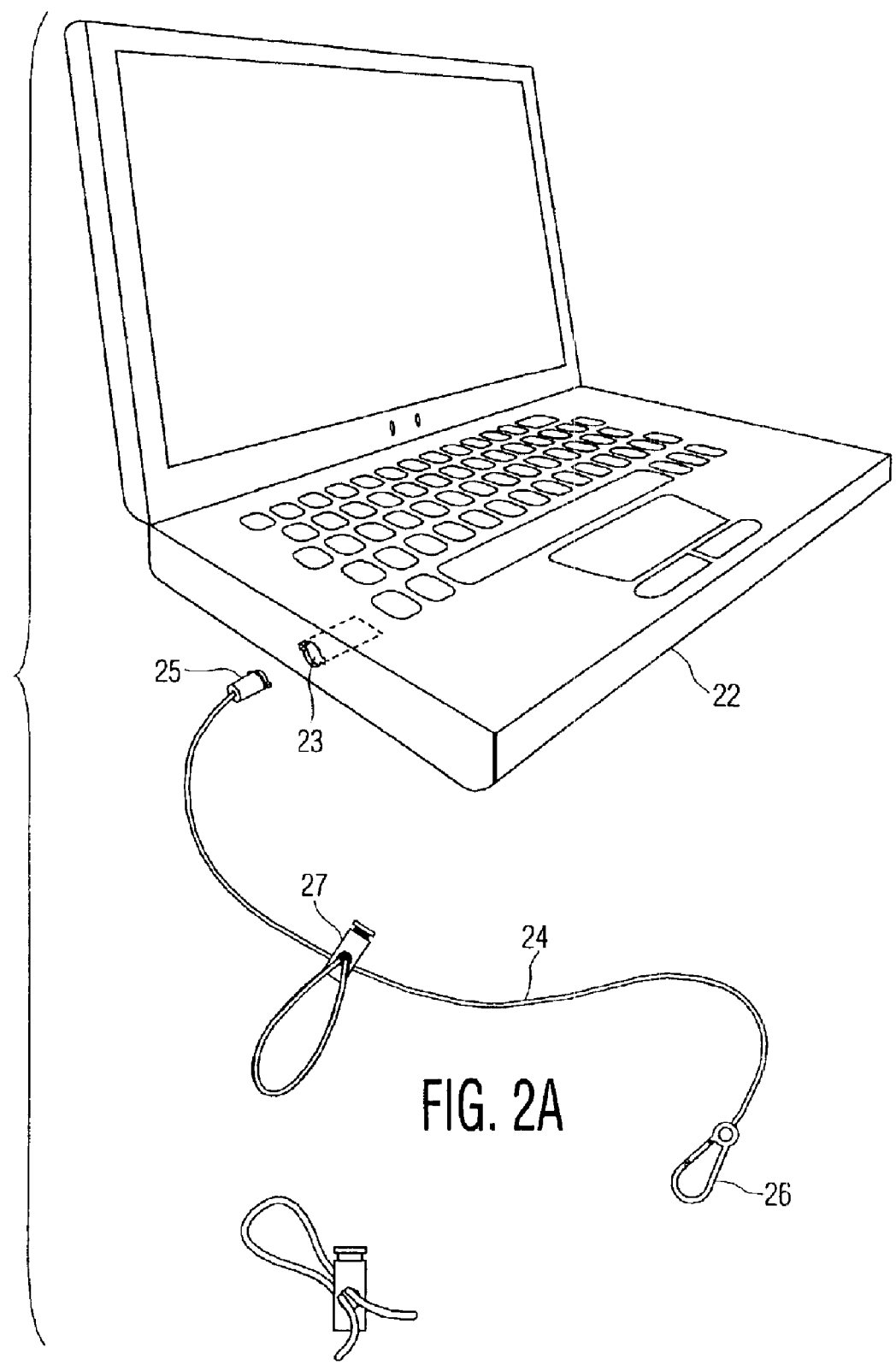
FIG. 2A is a perspective view of the laptop computer and tether arrangement of FIG. 1, on an enlarged scale, showing the tether arrangement on one side of the computer.
FIG. 2B is a view of the length-adjuster/cord-lock mechanism of the tether.

FIG. 1 shows a user 29 of a laptop computer 22. The laptop computer is tethered to the left side of the user 29 by means of a cord 24, which has at one end a peg 25 with two splines, which is inserted into and turned in the receiving hole 23 of the laptop computer, and thus locked in place by a conventional locking mechanism (not shown). At the other end of the cord 24 is a carabiner-style clip 26, which is clipped to the belt loop 28 of the user 29. A length-adjuster/cord-lock 27 (henceforth simply "length adjuster") makes it possible to adjust the effective length of the cord 24. On the right side of the user, a cord 24 and a length adjuster 27 is also shown, thereby indicating that the arrangement on the right side of the user 29 is a symmetrical duplication of the arrangement on the left side on the user 29. FIG. 2A provides a more detailed view of one tether in FIG. 1. FIG. 2B is a detailed view of the length-adjuster 27 in FIG. 1.

Figure 3:
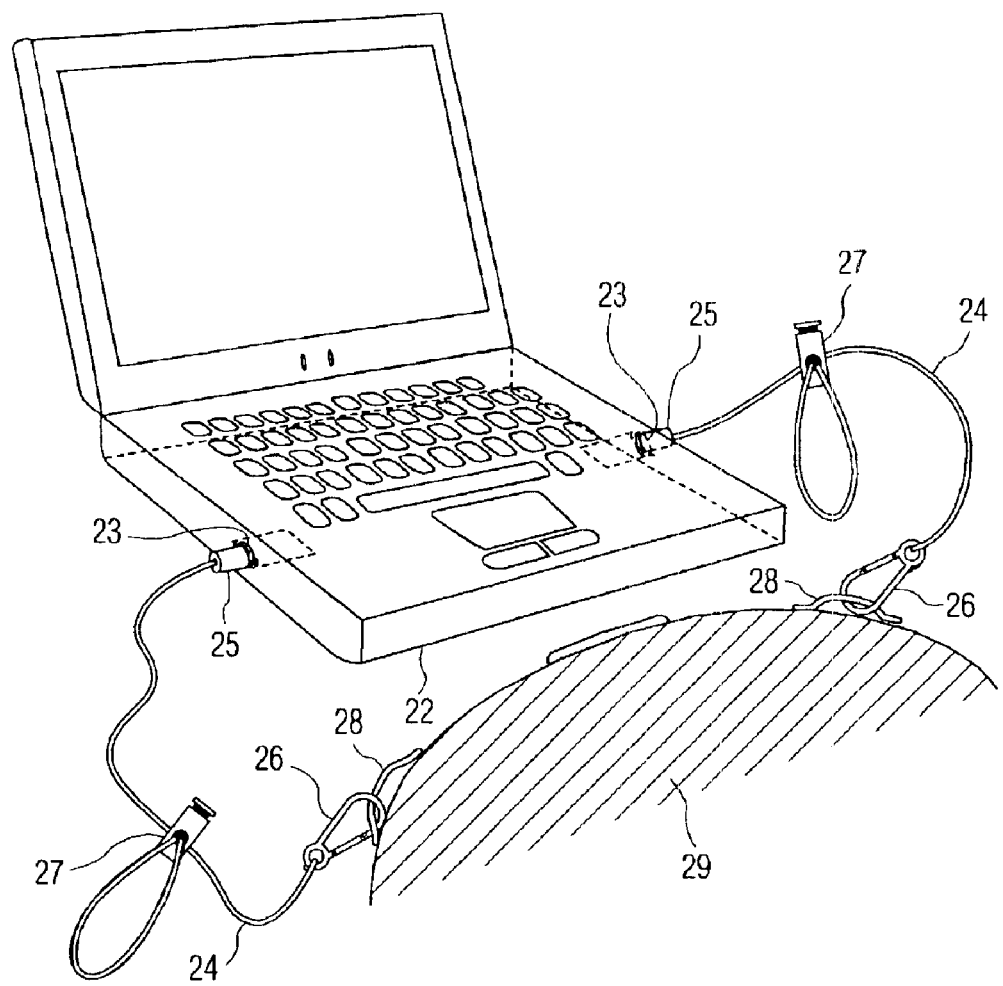
FIG. 3 is a view of the laptop computer in perspective and a fragmentary horizontal cross sectional view of the user, showing clips attached to user's belt loops.

FIG. 3 shows the peg 25 having been inserted into and turned in the receiving hole 23 of the laptop and thus locked in place by the conventional locking mechanism (not shown). The carabiner-style clip 26 at the other end of the cord 24 is clipped to the belt loop 28 of the pants of the user 29. This Figure shows the tethering arrangements on both sides of the computer.

In operation (FIGS. 1 and 3) the user sits and places the laptop computer 22 on the lap, and then attaches the cord 24 to the laptop 22 on the left side by inserting the end of the cord 24 that has the peg 25 with splines into the receiving hole 23, and turning the peg 25 within the hole so that it is locked in place by the mechanism inside the receiving hole 23. The user 29 then attaches the cord 24 to the left side of the user 29 by clipping the carabiner-style clip 26 to a belt loop 28 on the left side of the user 29. The user then duplicates these operations on the right side, so that a cord is connected to both the user and the laptop on the right side, and a second cord is connected to both the user and the laptop on the left side. With both cords attached, the user then adjusts the effective length of first one cord, then the other cord, to user's preference by means of the length adjusters 27.

This tether arrangement allows the laptop 22 to rest on the lap of the user 29, secure from falling off and, due to this security, allows the user 29 greater freedom with regard to leg placement, body posture, and position, and freedom from worry and anxiety over the possibility of having the laptop 22 fall off the lap. Thus, a general ease in operation of the laptop 22 is afforded.

Further, the presence of two cords, on opposite sides of the computer, serves to stabilize the computer in a position wherein it sits square on the user's lap, such that the user's right and left arms are equally extended from the user's body while using the keyboard; in other words, the two cords act to inhibit the lateral rotation (clockwise or counter-clockwise) of the laptop 22 on the lap surface. However, if a user should wish for the laptop to rest in a position on the lap that is not square, such that one arm is more extended than the other, this can be accomplished by deliberately adjusting the effective lengths of the tethers unequally.

Further, the adjustments made by the user in the effective lengths of the cords 24, by means of the length adjusters 27, sets the maximum distance between the laptop and the waist area of the user (it also sets the maximum distance between the laptop and the upper body, including the arms). This limits the maximum extension of the arms that the user must accomplish when working with the computer, which is an important determinant of comfort and ergonomic operation.

Further, although the tethers do not support the laptop computer or carry its weight when the laptop is being used, the tethers do allow the user, during a break from work, to stand if necessary without having to hold the laptop in the hands. Specifically, if a user stands, the laptop, which during work is resting atop the upper surface of the thighs, remains against the thighs even though the thighs are now vertical, that is, perpendicular with respect to the floor. In this position, the laptop hangs freely, with the tethers having taken up the weight and preventing it from falling to the floor.

Thus, the invention described here serves several functions, including preventing the lap top from falling off the lap and onto the floor where it might be damaged, inhibiting rotational movement of the laptop on the lap surface and thus stabilizing the laptop in a square position with respect to the upper body and arms, and setting the maximum working distance between the laptop, on the one hand, and the waist area and upper body of the user, on the other hand, and thereby limiting the maximum extension of the user's arms during work.

Multiple Embodiments

Figure 6:
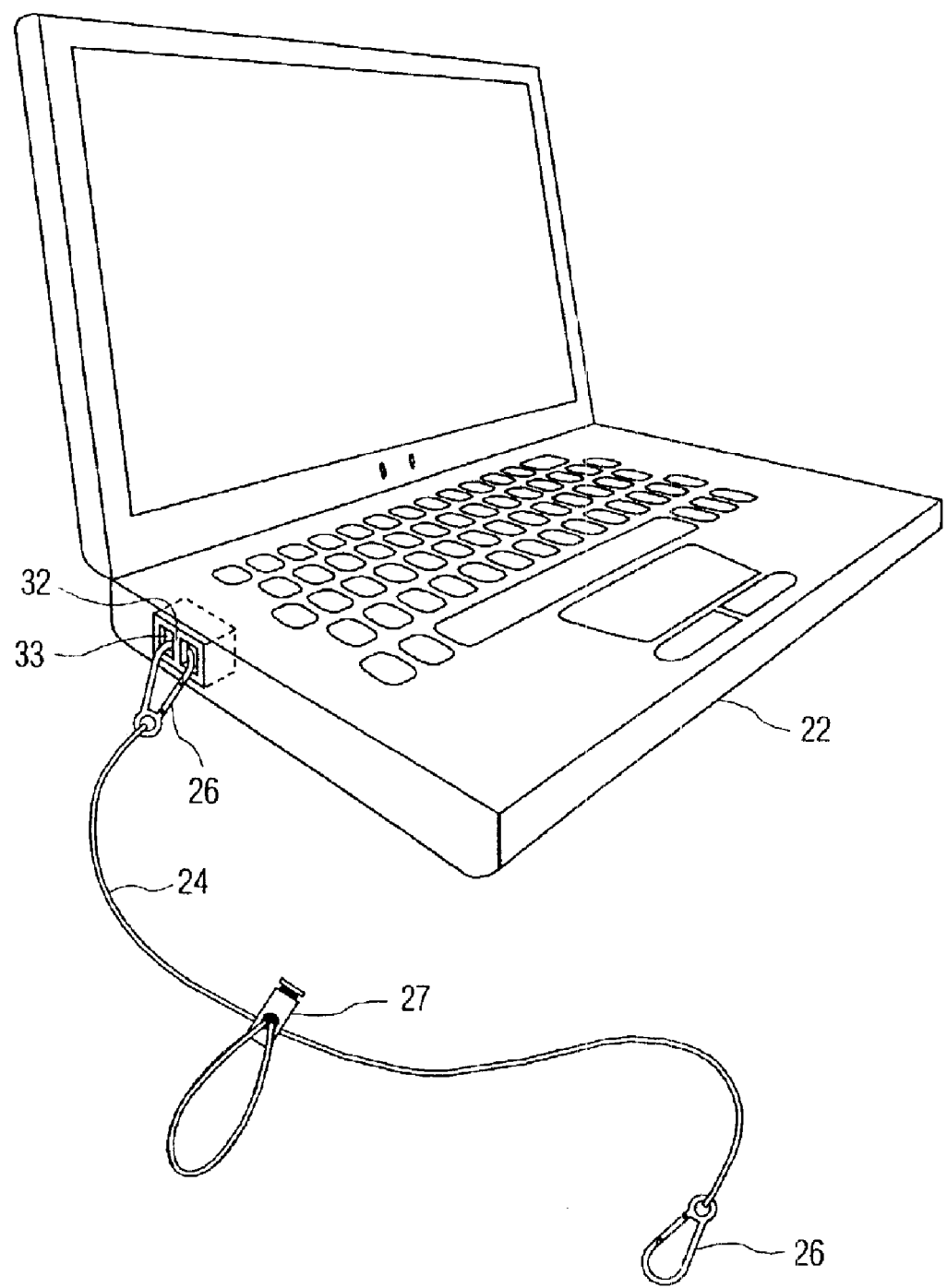
FIG. 6 is a perspective view of a laptop computer showing another alternative embodiment of a tether arrangement, with tether arrangement on one side of computer shown.
Figure 7:
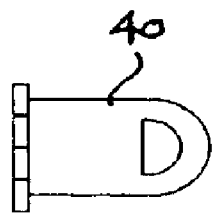
FIGS. 7–9 are views of three alternative connection terminals which may be built into or onto the laptop computer as part of the tether arrangement.
Figure 8:
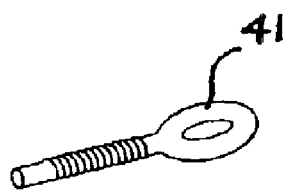

The invention described here can be modified in numerous ways to meet functional, technical, and aesthetic considerations relevant to the particular device being used. Some of the possible modifications are described here. As noted previously, variants are discussed with respect to a laptop computer, but all comments may apply to the use of the invention with other lap-usable electronic devices. These variants are discussed under the following twelve headings:

Means of Connecting Tether to Laptop
    Means of Connecting Tether to User
    Means of Adjusting Length of Tether
    Behind-the-Back Tethers
    Flexible and Inflexible Tethers
    Materials and Styles
    Number of Tethers
    Segmentation of Tethers
    Tether Configuration
    Consolidation of Functions
    Practical Applications of the Invention
    Possibility of Numerous Variants Means of Connecting Tether to Laptop. Numerous means of connecting the tethers to the laptop computer are possible. Some of these means will make use of two parts that can mate with each other, one such part attached to the tether and the other such part attached to the laptop, such that the mating of these two parts effectively connects the tether to the laptop. This pair of mating pieces may be male and female in construction, such as the peg-and-splines arrangement described previously and illustrated in FIG. 2A and elsewhere. Alternatively, the two mating pieces may consist of, as one mating piece, a clip that is permanently attached to the tether, and as the other mating piece, a post, ring, eyelet, or similar structure mounted to the laptop, with the clip capable of attaching to the post, hook, eyelet or similar device. One embodiment of this type is shown in FIG. 6, which shows a recess 33 in the housing of the laptop, with a post 32 extending across the recess, with clip 26 capable of attaching to the post 32. Two of many other types of pieces that are capable of mating with such a clip are shown in FIGS. 7 and 8; these pieces could be mounted onto a laptop computer, and the clip that is attached to the tether could be mated with them. FIG. 7 shows a hinge arrangement, which could be mounted to the laptop computer, with the distal portion of the piece, which contains the hole, swung flush with the computer, perhaps into a shallow recess, when the tether arrangement is not engaged; when establishing the tether connection is desired, the distal portion could be swung away from the computer, allowing a clip to attach to it. FIG. 8 shows a screw with eyelet, which could be screwed into a threaded hole in the housing of a laptop computer; the eyelet, which would protrude from the side of the laptop, would provide a convenient element for a clip to attach to. Many other conventional means of attachment between the tether and the laptop are possible, and the invention described in this application is not limited to those few conventional means that are discussed explicitly or illustrated.

The invention described here could be sold as original equipment that is integrated with the electronic device, such as would be found with a permanent connection terminal (for the tether) built into or onto the device; such connection terminals could be recessed in the laptop, protruding from the laptop, or flush with the laptop. Alternatively, the invention could be sold as a stand-alone invention that could be added, or "retrofitted," to an electronic device that was not previously modified or designed to be used with a tether system. This retrofit could be permanent, so that once attached it effectively becomes part of the laptop and can not be removed easily, or it could be a temporary or detachably retrofit, which could easily be removed so that the laptop is not permanently altered by the use of the retrofit.

Figure 13:
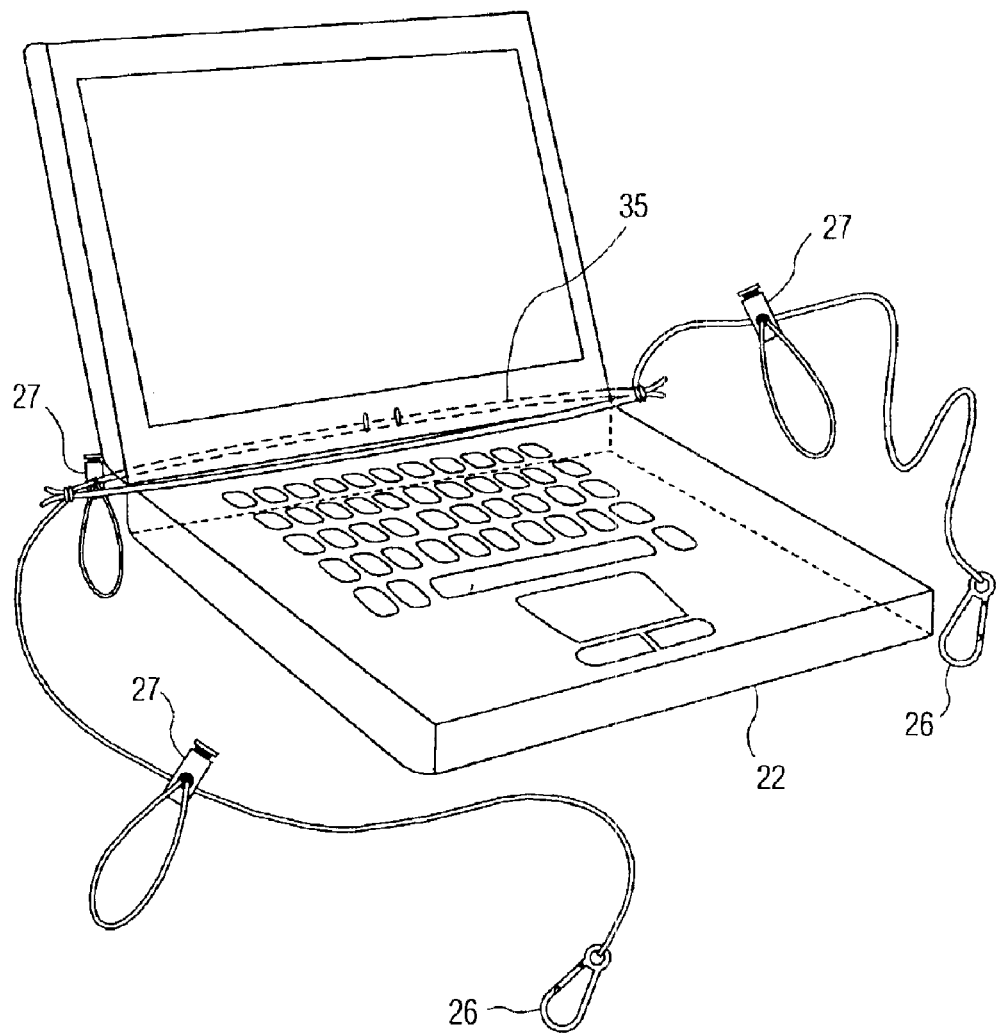
FIG. 13 is a perspective view of a laptop computer showing another alternative tether arrangement for use with an existing computer.

A few of many possible examples of retrofits include connection terminals that can be attached, or added on, to the laptop by C-type clamps, or by epoxy, or by being strapped on to the laptop with bands made of plastic, nylon, rubber, or other materials. These add-on connection terminals could be removable or could be constructed so that once added on would become a permanent part of the laptop. Other arrangements could make use of cords or other materials that encircle, loop around, or slip over part of the laptop, such as a loop of cord, to which tethers are permanently attached or temporarily mated; an example of this type of retrofit device is shown in FIG. 13. FIG. 13 shows a continuous loop of cord 35, which can be slid over the screen so that it comes to encircle the hinged area that lies between the base of the screen and the rear of the laptop body. Once positioned so that it encircles the hinge area, the loop could be tightened, like a noose, by means of a length adjuster 27 located on the loop 35. With the loop tightened snugly around the hinge area, the tether connection with the user is established by connecting the carabiner-style clips 26 to the belt loops of the user. Once the carabiner clips 26 are attached to the belt loops, the tethers are adjusted by means of the length adjusters 27.

Another example, not shown, of a retrofit method that makes use of an element that encircles a portion of the laptop would make use of a sleeve or "glove" made of fabric or other suitable material; this sleeve or glove could be slid over the base of the laptop, and could be designed with an opening so as not obstruct the keyboard and other buttons on the laptop surface; tethers could be attached to connection points on the sleeve or glove, or the ends of the tethers could be permanently attached to the sleeve or glove. Another type of retrofit variation could connect the tether or tethers to the laptop by means of a length of cloth or stretchable fabric or other suitable material, which could be wrapped or form-fit around the rear corners of the laptop base; or such material could be wrapped around all four corners, or hooked over corners.

These are just a few of many possible variations in which a suitable cord, fabric, or other material surrounds all or part of the laptop, with extension cords or straps extending from this material and functioning as tethers. This basic pattern could be modified to function with an around-the-back tether arrangement (see below). Many other conventional means of retrofit attachment between the tether and the laptop are possible, and the invention described in this application is not limited to those few conventional means that are discussed explicitly or illustrated.

Means of Connecting Tether to User. Various means can be used to connect one end of the tether to the user or the user's clothing. These include clips such as the carabiner-style clips described previously and illustrated in FIG. 2A and elsewhere, which may clip onto a belt loop, belt, or other piece of clothing; other kinds of clips designed to attach to clothing; devices designed to attach by squeezing, such as clips designed to attach to a waist band of a pair of trousers or a skirt; pieces of fabric attached to the end of the tether that fold back on themselves and connect to themselves by means of Velcro or snaps and thus form a loop that can be used to attach to a belt loop or belt. Clothing could also be modified in ways that permit novel means of attachment; for example, a pair of slacks or skirt might be modified with reinforced loops added above the pockets, to which the tether could be connected by means of a carabiner-style clip; other modifications of clothing are also possible, such as a hole in the clothing through which a button or other elements attached to the tether could be passed. Many other conventional means of attachment between the tether and the user are possible, and the invention described in this application is not limited to those few conventional means that are discussed explicitly or illustrated.

Figure 12:
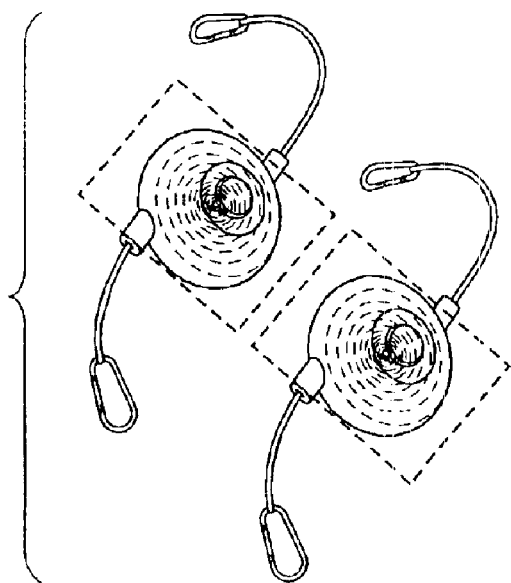
FIG. 12 is a perspective view of a tether arrangement showing an alternative length-adjusting mechanism, with retractable tethers. Two are shown.

Means of Adjusting Length of Tether. Various means are available to adjust the effective length of the tethers. These include means that take up the excess length of a flexible tether in the form of a loop, and means that retain the excess length within a confined space, such as by causing the length of excess tether to be wound upon a reel, such as a reel having a retractor spring configured so that the reel tends to constantly wind the cord around the reel. A loop-forming length-adjuster is shown in FIG. 2B. A reel-type, or retractor-type, length adjuster is shown in FIG. 12. (FIG. 12 also shows carabiner style clips on both ends of the adjustable tether, one clip for attachment to a belt-loop or belt, the other clip for attachment to a post mounted on the laptop.)

Retractable length adjusters could also be built into the laptop itself, as a permanent and original part of the laptop, or could be built into other parts. Some of these length-adjusting mechanisms, such as the reel mechanism just mentioned, also would provide a convenient means to store the tethers while the tether arrangement is not being used; for example, the tethers could be wound onto the reel and stored in the wound position. A free-standing retractor mechanisms could also be constructed so that the mechanism was combined with a mating piece, which mating piece could mate with a connection terminal built into the laptop; this retractor mechanism could be mated with the laptop, then the tether could be extended, and either attached to the user's clothing or passed behind the back of the user, thus forming an around-the-back tether (see below). A retractor mechanism could also be associated with a C-clamp or other means that would allow the retractor to be attached to a laptop that was not equipped with a connection terminal; the tether of such a retractor mechanism could be extended and attached to the user's belt loop or another piece of the user's clothing. Many other variants of retractor mechanisms are possible, which could be either free-standing or built into the laptop, or which could be added onto the laptop either permanently or detachably.

Many other conventional means of adjusting the effective length of the tether are possible, and the invention described in this application is not limited to those few conventional means that are discussed explicitly or illustrated.

Behind-the-Back Tethers. One means of securing a tether or tethers to the user makes use of arrangements in which a tether or other material is passed around the back of the user. Many embodiments of this basic pattern are possible.

Figure 4:
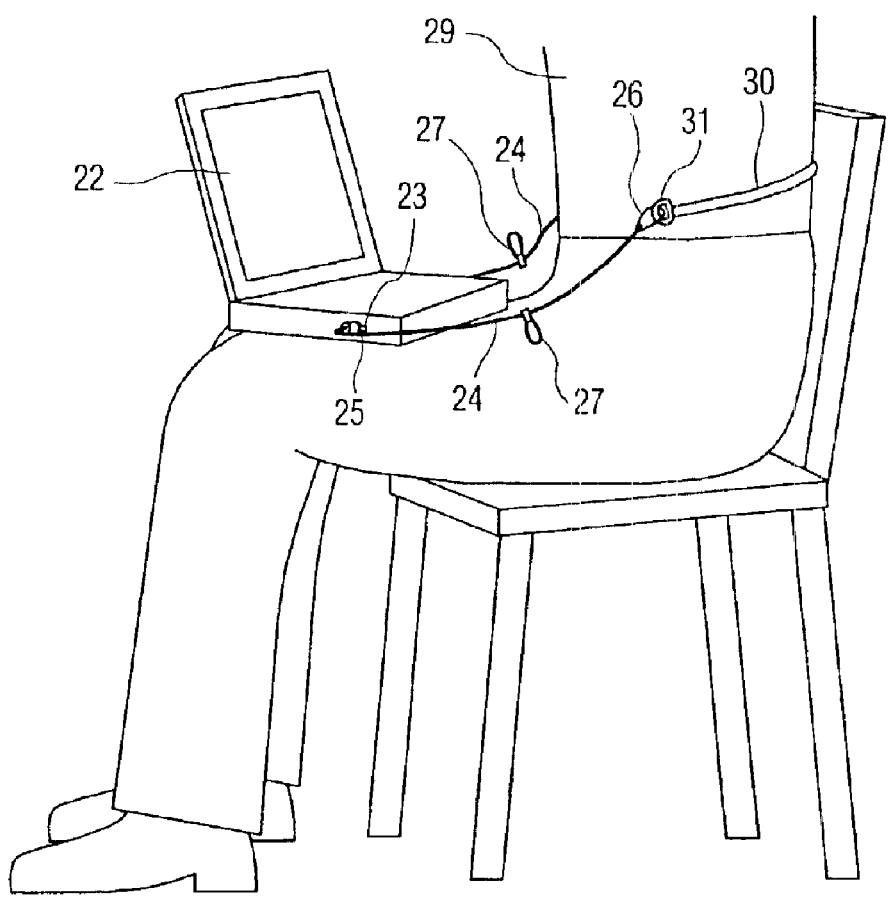
FIG. 4 is a perspective view of the laptop computer user showing an alternative embodiment of the tether arrangement.
Figure 5:
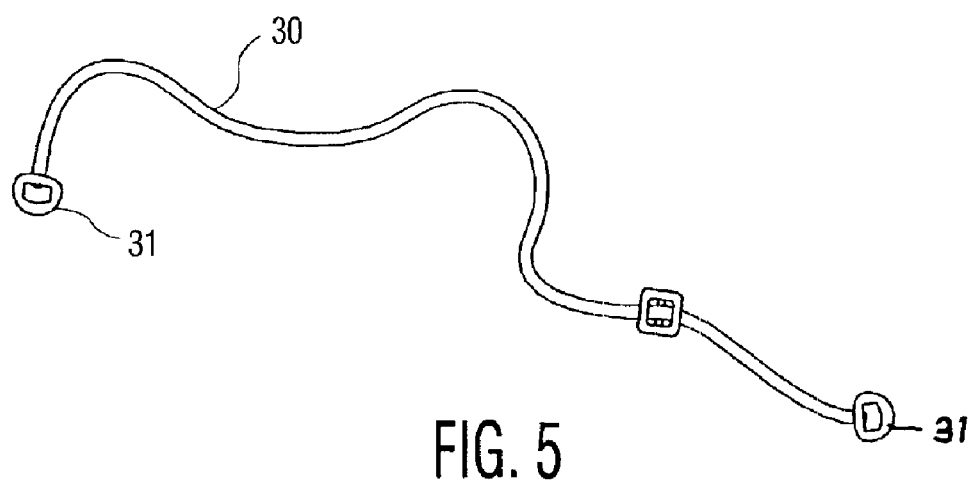
FIG. 5 is a view of a portion of the tether arrangement of FIG. 4.

One such embodiment is illustrated in FIGS. 4 and 5. These figures show a strap 30 that has an end ring 31 on each end. In this embodiment, the carabiner-style clips 26 are not clipped to the belt loops 28, as in FIGS. 1 and 3. Instead, the strap 30 is positioned around the back of the waist of the user 29, with the end ring 31 on the left side of the user 29 attached to the carabiner-style clip 26 on the left side of the user 29, and the end ring 31 on the right side of the user 29 attached to the carabiner-style clip 26 on the right side of the user. This arrangement forms an around-the-back retaining system, which secures the laptop to the user without the need for a direct mechanical connection between one end of the tether and the user or the user's clothing. Such an arrangement may be suitable for various users, including those wearing dresses or other garments that do not have either belt loops, belts, or waist bands. The behind-the-back strap could be adjustable in length, or it could be non-adjustable, relying on the adjustments made in the tether cords to set the total length of the tether-plus-strap arrangement. A length-adjuster is shown on the strap in FIG. 5. Many other conventional means of attaching the behind-the-back strap to the tethers, and many other conventional means of adjusting the effective length of the strap, are possible. For example, the strap could be attached to the tether not by clip and ring, but by male-female mating pieces. Further, material other than a strap could be used—for example, a strip of plastic could serve the same function—and for this reason we will, in the Claims, speak of a "spanning member" instead of a strap. Therefore, the invention described in this application is not limited to those few conventional means that are discussed explicitly or illustrated.

Many other behind-the-back variants are possible. One such variant uses two tethers, each with two ends, with one end of each tether attaching to the electronic device, and the other end of each tether having means capable of mating with each other, thus forming a continuous loop that passes around the body of the user. For example, the free ends (i.e., the end not attached to the laptop) of the two tethers could have male-female mating pieces attached, which pieces are capable of mating with each other behind the user's back. In another embodiment, the caribiner clips shown in FIG. 3 could clip directly onto each other, behind the user's back, thus forming a continuous loop behind the users back and securing the laptop to the user.

Another behind-the-back variant makes use of a single long tether having two ends, with each end connected to a point on the laptop, and the intervening length of tether passed behind the back of the user. A variant of this embodiment would include a retractor mechanism built into or added onto one side of the laptop, with a mating piece on the free end of the tether; this free end would be passed behind the user's back and mated with a compatible mating terminal on the other side of the laptop, thus forming a continuous loop around the user's back and securing the laptop to the user by means of this loop; further, the retractor mechanism could be associated with a cord-lock mechanism, that would maintain the tether at the desired length.

Another behind-the-back variant uses a tether having two ends, which is connected at one end to the electronic device and at the other end to the tether itself, thus forming a closed loop; this closed loop can encircle part of the user's body, effectively forming a lasso around the body, and securing the laptop to the user by means of this lasso. As an alternative to going around the waist, tethers might be passed around the upper body, such as around the upper back, shoulders or neck. Many other conventional means for securing a laptop to a user by means of a tether passed behind the back are possible, and the invention described in this application is not limited to those few conventional means that are discussed explicitly or illustrated.

Flexible and Inflexible Tethers. Although most tethers have been described in this application as cords, various tethering means can be used to tether the laptop to the user. These include fully flexible tethers such as nylon cords or straps, semi-flexible tethers such as elongated thin plastic strips made of bendable plastic, and rigid tethers such as rods made of hard plastic or metal. Flexible tethers composed of intrinsically inflexible materials, for example a chain made of metal links, may also be used. Means of adjusting the effective length of inflexible or semi-flexible tethers are possible. For example, for a rigid tether, the effective length can be adjusted by a telescoping arrangement. Many other conventional means of constructing tethers are possible, and the invention described in this application is not limited to those few conventional means that are discussed explicitly or illustrated.

Materials and Styles. The components of this invention can be made of any suitably strong and durable material, natural or synthetic or composite, including but not limited to nylon, leather, cloth, rubber, plastic, metal. The styles and mechanisms portrayed above are also variable, and the illustrations in the text and the Figures are not intended to limit the embodiments.

Number of Tethers. Depending on the electronic device being tethered, and the aesthetic and functional objectives of the manufacturer of the tether system, the number of tethers can range from one to many. For example, a small electronic device such as a personal organizer might be tethered with a single tether. In contrast, a large electronic device might require more than two tethers. In addition, tethers could split or consolidate along their path between the electronic device and user. Thus, for example, two tethers attached at two different points on an electronic device could, en route to the user, come together and merge into a single tether, in a "Y" configuration, and then attach to the user at a single point; or this single consolidated tether might, for instance, split and re-form two tethers. These are just two of many possible examples by which tethers could split or consolidate during their paths between electronic device and user.

Segmentation of Tethers. Tethers may be composed of a single piece of material, or may be made in such a way that they are composed of multiple contiguous segments of material that are attached to each other. In accordance with the possibility of tethers being composed of multiple segments, for the purpose of this application the term "tether" shall be defined such that it includes not only elongagted members made of a single piece of material, but also elongated attachment members that are composed of a plurality of members that are designed to be fitted together to form a single functional elongated attachment member.

Figure 10:
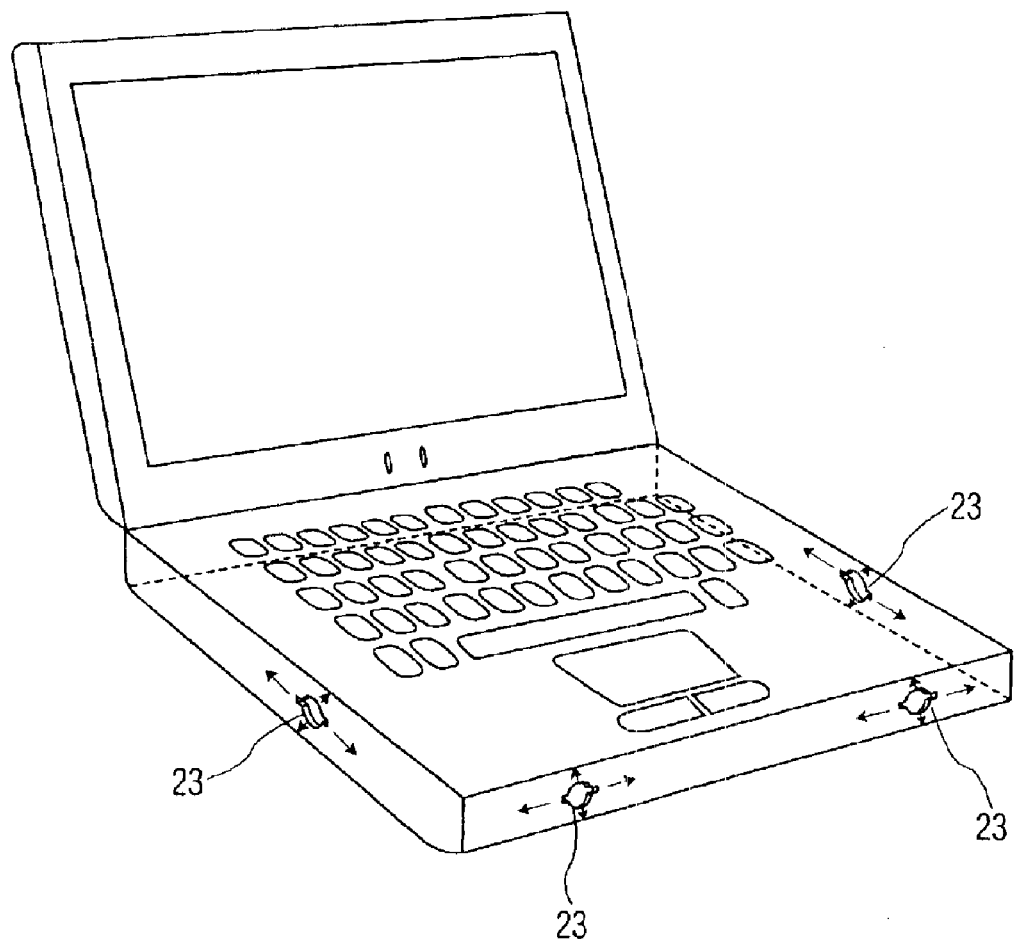
FIG. 10 is a perspective view of a laptop computer showing some alternative sites for connection terminals for the tether arrangement.

Tether Configuration. Tethers could be attached to any surface of the electronic device, including the front surface (i.e., the surface perpendicular to the plane of the lap and thus facing the abdomen of the user), the bottom surface (i.e, the surface in contact with the user's lap), the side surfaces or the top surface (i.e., keyboard surface) of the device, or even the back surface, with the tethers passing around the back corners of the laptop and extending towards the user. Further, tethers could emanate from opposite sides of the machine (e.g., one tether coming from each side of the electronic device), from spaced-apart points on the same surface (e.g., both coming from the front of the device, one from the left side and the other from the right side of this surface), symetrically or asymetrically (e.g., one tether from the right side, the other tether from the left front of the electronic device). Several of these variants are suggested in FIG. 10, which shows a number of alternative locations for receiving holes.

Figure 11:
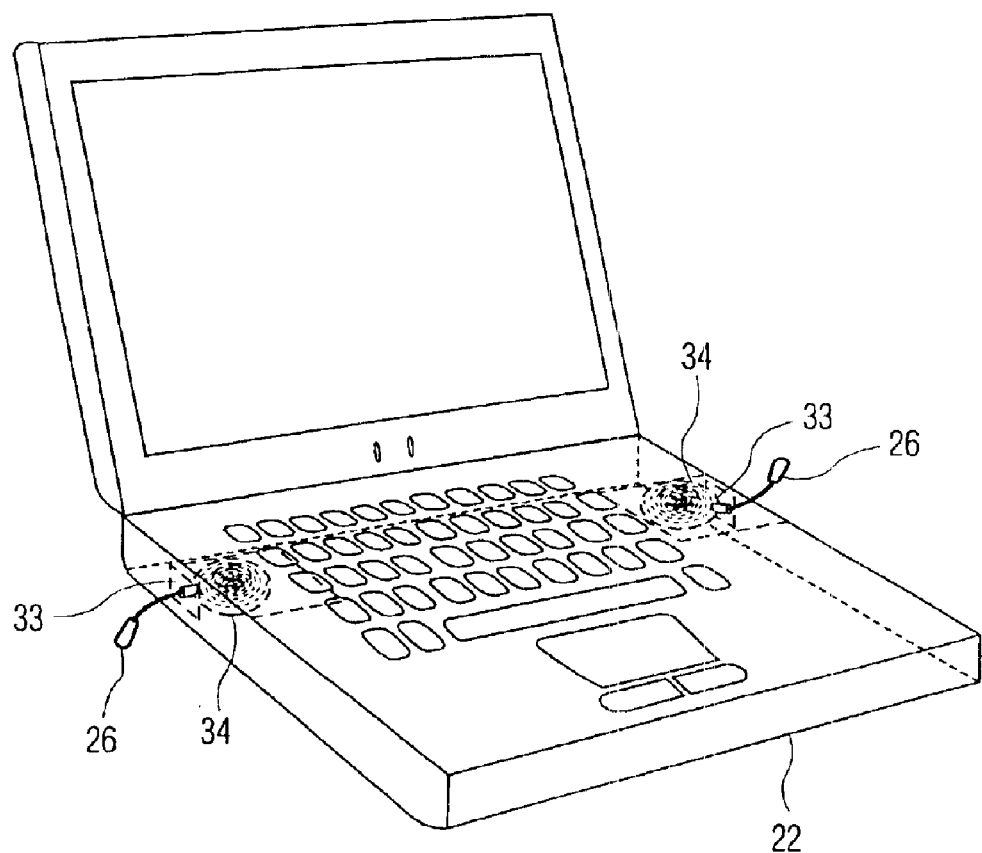
FIG. 11 is a perspective view of a laptop computer showing another tether arrangement, with retractable tethers built into the computer.

Consolidation of Functions. Many functional aspects of the invention can be consolidated into unified mechanical elements. For example, a length adjuster that acts to retract a tether cord can be built into or onto the electronic device. FIG. 11 is a view of a laptop computer 22 furnished with a retractable cord 34 with one carabiner-style clip 26 on the free end. The retractable mechanism, which in this case may be considered a connection terminal, is located within the laptop housing. When in the retracted position the clip 26 rests in the cavity 33 in the computer 22. The retractable mechanism would allow for the cord 34 to be locked at any given length (cord lock for retractable mechanism is conventional and, hence, not shown in FIG. 11). Arrangements are symmetrical on the right and left sides of the user 29.

Figure 9:
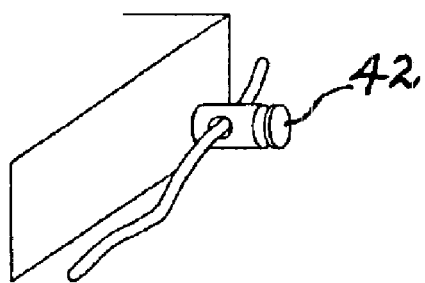

Alternatively, the length adjuster may be consolidated with a connection terminal built into or onto the device, to which the tether could be attached. For example, FIG. 9 shows a naked (i.e, unmodified, with no mating piece attached) tether passes through a length-adjuster/cord-lock attached to the housing of the electronic device; such an arrangement would allow the length-adjuster/cord-lock itself to function as a connection terminal for an unmodified tether end. Alternatively, the length-adjuster/cord-lock could be combined with a carabiner that clips onto a user's belt. Alternatively, the length adjuster could be built into a mating piece on the end of the tether that attaches to a connection terminal on the device. Such combinations might be especially convenient if they included means to sequester the excess tether, such as a length adjuster that winds a flexible tether around a reel. Many other ways of consolidating functions of this invention are possible, and the possibilities for consolidation should not be limited to those few means that are discussed explicitly or illustrated.

Practical Applications of the Invention. As noted, this invention can be applied not only to laptop computers but towards all electronic devices that are "lap-usable"—that is, to all devices which are currently or potentially capable of being used on the lap of a seated user. A few of many possible examples include keyboards and other data entry devices that are either wireless or attached by wires to a computer system, electronic drawing pads, control units for gaming or entertainment centers, small e-mail or personal organizer units, communication systems such as organizer-cell phone units, industrial control systems and vehicular control or navigation systems suitable for use on the lap. Some of these lap-usable electronic devices may not currently exist, and may in fact be brought into existence in response to the possibility of a stable lap working environment created by the invention discussed in this application.

Possibility of Numerous Variants. With this invention, numerous variations on the embodiments described are possible: variations in size, shape, color, and material composition of components, and of design and mechanisms of components, and variations in the arranging and combining of components. The choice of preferred embodiment would be dependent upon the particular electronic device being tethered: its shape, weight, how it balances (i.e., the internal distribution of this weight within its own housing); considerations of aesthetics and style, and individual preferences of the manufacturers. Thus, the scope of the invention should not be limited to the specific embodiments and variants discussed or illustrated in this application, as other variants are possible.

What is claimed is:

1. A laptop computer assembly comprising:
   a laptop computer having a case with a bottom adapted to rest upon a lap of a user, a pair of sides, and a computer structure within said case;
   a pair of flexible tethers secured to opposite sides of said case and extending along said sides thereof, each of said tethers having a free end adapted to engage at the waist to a point on a garment worn by said user; and
   a pair of length adjusters, each length adjuster associated with one of said flexible tethers, each length adjuster being lockable, enabling the user to securely determine the effective length of each tether;

whereby the user can set the effective lengths of the two tethers to be equal to one another or unequal to one another, thereby allowing for the computer to be positioned on the lap in either a square or an off-square alignment.

2. The laptop computer assembly defined in claim 1 wherein each of said free ends has a clip engageable in a respective loop of said garment.

3. The laptop computer assembly defined in claim 2 wherein each of said clips has an element adapted to spring closed to retain said clip in said respective loop.

4. The laptop computer assembly defined in claim 3 wherein each of said clips is a carabiner clip and each of said loops is a belt loop.

5. The laptop computer assembly defined in claim 1 wherein each of said tethers is secured to said computer by a connector that removably engages a corresponding part of said computer.

6. The laptop computer assembly defined in claim 1 wherein said tethers are secured to said case by a flexible loop passing over a portion of said laptop computer.

7. The laptop computer assembly defined in claim 6 wherein said portion of said laptop computer is a screen that is erectable into an upright position.

8. The laptop computer assembly defined in claim 1 wherein each of said length adjusters includes a mechanism for forming a loop in the associated tether, enabling adjustment of said associated tether by locking an adjusted length of said loop.

9. The laptop computer assembly defined in claim 1 wherein each of said length adjusters includes a reel-type retractor mechanism.

10. The laptop computer assembly defined in claim 1 wherein each of said length adjusters is located within the case of said laptop computer.

* * * * *